US010557381B2

(12) United States Patent
Rogatsch et al.

(10) Patent No.: US 10,557,381 B2
(45) Date of Patent: Feb. 11, 2020

(54) CLAMPING NEST HAVING FIXING ELEMENTS

(71) Applicant: THYSSENKRUPP PRESTA TECCENTER AG, Eschen (LI)

(72) Inventors: Thomas Rogatsch, Feldkirch (AT); Manfred Muster, Ludesch (AT)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 977 days.

(21) Appl. No.: 14/781,445

(22) PCT Filed: Mar. 28, 2014

(86) PCT No.: PCT/EP2014/000839
§ 371 (c)(1),
(2) Date: Sep. 30, 2015

(87) PCT Pub. No.: WO2014/161649
PCT Pub. Date: Oct. 9, 2014

(65) Prior Publication Data
US 2016/0053639 A1    Feb. 25, 2016

(30) Foreign Application Priority Data
Mar. 30, 2013    (DE) .......................... 10 2013 005 713

(51) Int. Cl.
*F01L 1/047*    (2006.01)
*B23P 11/00*    (2006.01)

(52) U.S. Cl.
CPC ............... *F01L 1/047* (2013.01); *B23P 11/00* (2013.01); *B23P 2700/02* (2013.01);
(Continued)

(58) Field of Classification Search
CPC .. B25B 5/00; B25B 5/02; B25B 5/082; B25B 5/125; B25B 527/00; B23P 11/00; B23Q 3/00
See application file for complete search history.

(56) References Cited

U.S. PATENT DOCUMENTS 5,201,501 A * 4/1993 Fassler ..................... B23Q 1/76
269/156
6,802,111 B1   10/2004 Dion et al.
8,137,379 B2 * 3/2012 Labash .................. A61H 39/04
269/3

FOREIGN PATENT DOCUMENTS

DE          32 27 693 A1     1/1984
DE    10 2004 060 807 B3     6/2006
(Continued)

OTHER PUBLICATIONS

Machine Translation of DE102008064194A1. Jul. 1, 2010. Klaus Schmeckenbecher et al. (Year: 2010).*
(Continued)

*Primary Examiner* — David P Bryant
*Assistant Examiner* — Nirvana Deonauth
(74) *Attorney, Agent, or Firm* — thyssenkrupp North America, Inc.

(57) ABSTRACT

The invention relates to a clamping nest for positioning a component on a shaft, and joining it thereto. The component here has a central part with a circular-cylindrical aperture for accommodating the shaft. The clamping nest has a fork-shaped region for accommodating the component, wherein the fork-shaped region comprises a plurality of clamping elements, which secure the angled position of the component within the fork-shaped region. The fork-shaped region also comprises two opposite bearing surfaces, which secure the axial position of the component in a form-fitting manner in both axial directions.

16 Claims, 5 Drawing Sheets

(52) U.S. Cl.
CPC .......... *F01L 2001/0471* (2013.01); *F01L 2001/0475* (2013.01); *F01L 2103/01* (2013.01)

(56) References Cited

FOREIGN PATENT DOCUMENTS

| | | |
|---|---|---|
| DE | 10 2008 064 194 A1 | 7/2010 |
| DE | 102009060349 A1 | 6/2011 |
| DE | 102009060350 A1 | 6/2011 |
| DE | 102010045047 A1 | 3/2012 |
| DE | 10 2010 055 123 A1 | 6/2012 |
| DE | 102011106981 A1 | 1/2013 |
| EP | 0278676 A | 8/1988 |
| JP | S62-97722 A | 5/1987 |
| JP | H06-114653 A | 4/1994 |
| JP | 08105307 A | 4/1996 |
| JP | 2003106325 A | 4/2003 |
| KR | 101101862 B1 | 1/2012 |
| WO | 2004/079163 A1 | 9/2004 |
| WO | 2014/161649 A1 | 10/2014 |

OTHER PUBLICATIONS

German language International Search Report for International Patent Application No. PCT/EP2014/000839; dated Jun. 16, 2014.
English translation of International Search Report for International Patent Application No. PCT/EP2014/000839; dated Jun. 16, 2014.
English translation of abstract of DE 102009060350 A1.
English translation of abstract of DE 102011106981 A1.
English translation of abstract of DE 102010045047 A1.
English translation of abstract of DE 102009060349 A1.
Die Bibliothek der Technik, Verlag Moderne Industrie 2003. (Previously submitted Mar. 30, 2019)—Relevant part of document is attached supplemental to previous submission of non-English document-.
Die Bibliothek der Technik, Verlag Moderne Industrie 2003. [In process of obtaining English translation.].

\* cited by examiner

CLAMPING NEST HAVING FIXING ELEMENTS

CROSS REFERENCE TO RELATED APPLICATIONS

This application is a U.S. National Stage Entry of International Patent Application Serial Number PCT/EP2014/000839, filed Mar. 28, 2014, which claims priority to German patent application no. DE 102013005713.2 filed Mar. 30, 2013 the entire contents of each of which are incorporated herein by reference.

FIELD

The present disclosure is related to a clamping nest for use in the manufacture of camshafts.

BACKGROUND

In the production of camshafts, different components are produced separately and joined onto a prefabricated shaft. For joining purposes, the components on the shaft are moved axially on to a widened portion of the shaft. This is done typically using a tool referred to as a clamping nest. Such a tool is known from DE 102009060349 A1. Using the tool referred to in said document as an aligning unit, the tool is gripped and moved along the shaft, i.e. in the axial direction. The aligning unit additionally has various elements which adjust the angled position of the component. In the axial direction, the aligning unit disclosed in said document has just one stop to fix the component in a form-fitting manner in the axial direction. The component can thus be moved, by way of the aligning unit, only in one axial direction. Once the component has been fastened, the aligning unit is moved in the opposite axial direction until it is separated from the component, and can then be removed. In the case of modern engines, the amount of installation space on and around the camshaft, however, is vastly restricted. Movement in the axial direction for removing the tool is therefore always not possible.

SUMMARY

In one aspect of the present disclosure, an embodiment of a clamping nest for use in the manufacture of camshafts for motor vehicles is disclosed. The clamping nest, following installation and joining of a component thereon, can be removed in a radial direction with respect to the camshaft. The component to be installed has a central part with a circular-cylindrical aperture for accommodating the shaft. The clamping nest further includes a fork-shaped region or fork-shaped clamping fixture for accommodating the component, the region comprising a plurality of clamping elements, which secure the angled position of the component within the fork-shaped region. The fork-shaped region or clamping fixture additionally comprises two opposite bearing surfaces, which secure the axial position of the component in a form-fitting manner in both axial directions. As a result of the two opposite bearing surfaces, the component is retained reliably in the fork-shaped region and the clamping nest, following installation, can be removed in the radial direction of the camshaft. One benefit to such a clamping nest is that, during installation of the component, the component can be moved in both axial directions with the aid of the clamping nest.

BRIEF DESCRIPTION OF THE DRAWINGS

The present disclosure is described in detail below with reference to the attached drawing figures, wherein.

DETAILED DESCRIPTION

In one aspect of the present disclosure, an embodiment of a clamping nest for use in the manufacture of camshafts for motor vehicles is disclosed. The clamping nest, following installation and joining of a component thereon, can be removed in a radial direction with respect to the camshaft. The component to be installed has a central part with a circular-cylindrical aperture for accommodating the shaft. The clamping nest further includes a fork-shaped region or fork-shaped clamping fixture for accommodating the component, the region comprising a plurality of clamping elements, which secure the angled position of the component within the fork-shaped region. The fork-shaped region or clamping fixture additionally comprises two opposite bearing surfaces, which secure the axial position of the component in a form-fitting manner in both axial directions. As a result of the two opposite bearing surfaces, the component is retained reliably in the fork-shaped region and the clamping nest, following installation, can be removed in the radial direction of the camshaft. In addition, during installation, the component can be moved in both axial directions with the aid of the clamping nest.

Within the context of this application, the axial direction is understood to be the direction in which the shaft extends. This is therefore the direction of the axis of rotation of the shaft. As seen in relation to a component, this is therefore the direction of the axis of symmetry of the circular-cylindrical aperture for accommodating the shaft.

The radial direction is understood to be any direction which is located perpendicularly to the axial direction.

The component is often a cam. The component then has at least one extension, which extends radially away from the shaft. Other components such as sensor wheels are likewise possible.

In the case of a developed embodiment, the plurality of clamping elements are arranged such that the component can be accommodated in an orientation in which the extension is oriented essentially along the fork axis in the direction of the clamping nest. This allows the clamping nest to be of particularly narrow configuration in a direction which runs perpendicularly to the fork axis and perpendicularly to the axial direction.

In some methods for producing camshafts, the component first of all is positioned in the vicinity of a widened portion of the shaft and then is pressed onto said widened portion by means of the clamping nest, so that the component is fixed there. The widened portion may be, in particular, a rolled formation. This pressing-on operation requires a relatively large amount of force. It is therefore advantageous if the bearing surfaces are of solid configuration such that the component can be pressed onto a widened portion of the shaft by means of the clamping nest.

It is also advantageous if at least one of the two bearing surfaces comprises a fixing element on the side directed toward the other bearing surface, in order to fix the axial position of the component between the bearing surfaces by a press fit. The fixing element may be formed, for example, by a leaf spring which, when the component is pushed into the clamping nest, is compressed and thus pushes the component onto the opposite bearing surface. As an alternative, the fixing element may also be formed by a flexible plastics material which likewise, when the component is pushed into the clamping nest, is compressed and thus pushes the component in the direction of the opposite bearing surface. The leaf spring, which is typically produced from a metal, has the additional advantage that it is less sensitive to high temperatures which may occur during the joining process.

In the case of some embodiments, at least one of the clamping elements is configured in the form of a ball bearing. This has the advantage that, in comparison with a single-piece clamping element, the friction of the clamping nest is reduced. Friction occurs, for example, when the component is rotated into a predetermined angled position with the aid of the clamping elements, by way of a kind of funnel effect, as described herein below. The surface of the component here slides along the clamping elements. Friction may thus give rise to the clamping nest being subjected to wear. This is reduced by the ball bearings according to the invention.

In the case of a developed variant of the clamping nest, the fork shaped clamping fixture comprises a fixed base and a complementary adjustable slide operably coupled thereto, with one of the two bearing surfaces being disposed on the adjustable slide, which can be moved in the radial direction, with respect to the fixed base, between a bracing position and an accommodating position. In the bracing position, the slide and the other bearing surface delimit the axial position of the component in both axial directions. In contrast, in the accommodating position, the slide, in comparison with the bracing position, is drawn back from the fork end of the clamping nest. The axial position of the component, in the accommodating position, is thus secured in a form-fitting manner only in one axial direction. Designing the one bearing surface in the form of a slide makes it possible for the component to be introduced axially into the clamping nest while the slide is located in the accommodating position. Once the slide has then been moved into the bracing position, the axial position of the component is secured in a form-fitting manner in both axial directions, so that the component can be moved in both axial directions on the shaft. Once the component has been moved axially to the desired position of the shaft, it is fastened there. In some methods, the fastening and movement operations take place in one step, the component being pressed onto a widened portion of the shaft. Once the component has been fastened on the shaft, the slide can be moved into the accommodating position, so that the clamping nest can be removed either in the axial direction or the radial direction or by a combined axial/radial movement, as is explained herein below. This therefore allows the clamping nest according to the invention to be used in a particularly flexible manner.

Advantageously at least one first clamping element of the plurality of clamping elements is connected to the slide and a second clamping element of the plurality of clamping elements is connected to the opposite bearing surface of the two bearing surfaces. When the slide is moved into the bracing position, the radial distance between the first clamping element and the second clamping element is therefore reduced. The reduction of this distance brings a previously introduced component into contact with the first clamping element and the second clamping element and thus fixes the same in the radial direction, that is to say clamps it in between the first and the second clamping elements. In the case of a preferred development, the first clamping element and the second clamping element are designed, and positioned, such that, in the bracing position, the component has a secure angled position within the fork-shaped region. In addition to the component being fixed in a form-fitting manner in the axial direction by the two opposite bearing surfaces and being fixed in a form-fitting manner in the radial direction by the first clamping element and the second clamping element, it is therefore additionally the case that the first clamping element and the second clamping element additionally prevent the component from being rotated about the axial direction. Since the angled position of the components, in particular of cams, on a shaft is important for the subsequent engine control, it is necessary for there to be no undesired rotation of the components during the installation process. Furthermore, there are specific installation processes which involve axial rotation of the components about the axial direction. It may therefore be advantageous, possibly following temporary preliminary positioning, to join the components on to a widened portion of the shaft and then to rotate the same axially at this position. The friction between the shaft and components gives rise to diffusion processes in the two contact surfaces. This increases the amount of torque which can be transmitted from the shaft to the component. This means that, using the clamping nest according to the invention, it is possible not just to prevent undesired rotation, but additionally to bring about desired rotation by the component being rotated about the axial direction, with the aid of the clamping nest, once it has been pressed on.

Fixing to particularly good effect in the radial direction can be achieved if the first clamping element is spaced apart from the fork end of the slide to the extent where, in the bracing position, it acts on the extension of the component, and the second clamping element is arranged in such proximity to the fork end of the other bearing surface that, in the bracing position, it acts on the central part.

In order to prevent the component from rotating about both axial directions, the clamping nest advantageously has two first clamping elements of the plurality of clamping elements, both connected to the slide and spaced apart from the fork end of the slide to the extent where, in the bracing position, they act on the extension of the component, said two clamping elements being spaced apart from one another by such a distance that the extension of the component, in the bracing position, ends up located between the two first clamping elements.

In the case of the installation process described above, which involves rotation of the component about the axial direction, relatively high forces are transmitted via the component. It is therefore advantageous if the forces are introduced uniformly into the component. In order to achieve this, the clamping element advantageously has two second clamping elements of the plurality of clamping elements, both connected to the bearing surface located opposite the slide. The two second clamping elements here are arranged in such proximity to the fork end that, in the bracing position, they act on the central part of the component in respective contact regions, wherein the distance between the two contact regions is between 50° and 130°, in particular between 70° and 110°, as seen in relation to the axis of rotation of the shaft. The points where the forces act during rotation are thus distributed over the circumference of the component.

In the case of a particularly preferred variant of the invention, the first clamping element and the second clamping element are designed, and positioned, such that a component accommodated therein is rotated into a predetermined angled position by virtue of the slide being moved from the accommodating position into the bracing position. The first clamping element, which is connected to the slide, gives rise, so to speak, to a kind of funnel effect when the slide is moved from the accommodating position into the bracing position. During this rotation, the component is supported on the second clamping element. This arrangement has the advantage that the component need not be introduced precisely into the clamping nest; rather, an amount of angular inaccuracy can be tolerated here. The precise angular adjustment which is necessary is then carried out automatically when the slide is moved into the bracing position. This simplifies the installation process considerably.

In some embodiments, the second clamping element, in the axial direction, has an extent which is smaller than the distance between the opposite bearing surfaces. This makes it more straight-forward to remove the clamping nest following installation. In the embodiments in which the second clamping element is arranged in such proximity to the fork end of the bearing surface located opposite the slide, it is not necessarily possible for the clamping nest, following movement of the slide into the accommodating position, to be removed immediately in the radial direction. Depending on the specific arrangement of the second clamping element, it may be the case that there is a form fit present between the second clamping element and component preventing the clamping nest from being removed in the radial direction. In these cases, the clamping nest is moved first of all in the axial direction, until there is no longer any form fit present in the radial direction between the component and all the clamping elements of the clamping nest, and the clamping nest is then removed in the radial direction. The smaller the extent of the second clamping element in the axial direction, the smaller is the distance which the clamping nest has to be moved in the axial direction until there is no longer any form fit present in the radial direction. The variant in which the second clamping element, in the axial direction, therefore has an extent which is smaller than the distance between the opposite bearing surfaces thus has the advantage that a smaller amount of installation space is necessary in the axial direction in order to remove the clamping nest following installation of the component.

The invention likewise relates to a method of positioning a component on a shaft, and joining it thereto, by means of an above described clamping nest, comprising the following steps:
a) Supplying a component which has a circular-cylindrical aperture
b) Accommodating the component in the fork-shaped region of the clamping nest
c) Introducing a shaft, which has at least one widened portion, into the aperture
d) Pressing the component onto the widened portion by means of the clamping nest
e) Removing the clamping nest in radial direction.

Furthermore, the invention also relates to a method of positioning a component on a shaft, and joining it thereto, by means of a clamping nest, comprising the following steps:
a) Supplying a component which has a circular-cylindrical aperture
b) Supplying the clamping nest in the accommodating position
c) Accommodating the component in the fork-shaped region of the clamping nest
d) Moving the slide radially in the direction of the shaft so that the clamping nest is moved into the bracing position,
e) Introducing a shaft, which has at least one widened portion, into the aperture
f) Pressing the component onto the widened portion by means of the clamping nest
g) Moving the slide radially away from the shaft so that the clamping nest is moved into the accommodating position
h) Moving the clamping nest in the axial direction until there is no form fit present in the radial direction between the component and all the clamping elements of the clamping nest.
i) Removing the clamping nest in the radial direction.

The two methods have the advantages which have already been described previously in relation to the clamping nest itself.

The present disclosure will be described in further detail below with reference to the attached drawing figures.

Figure 1A:
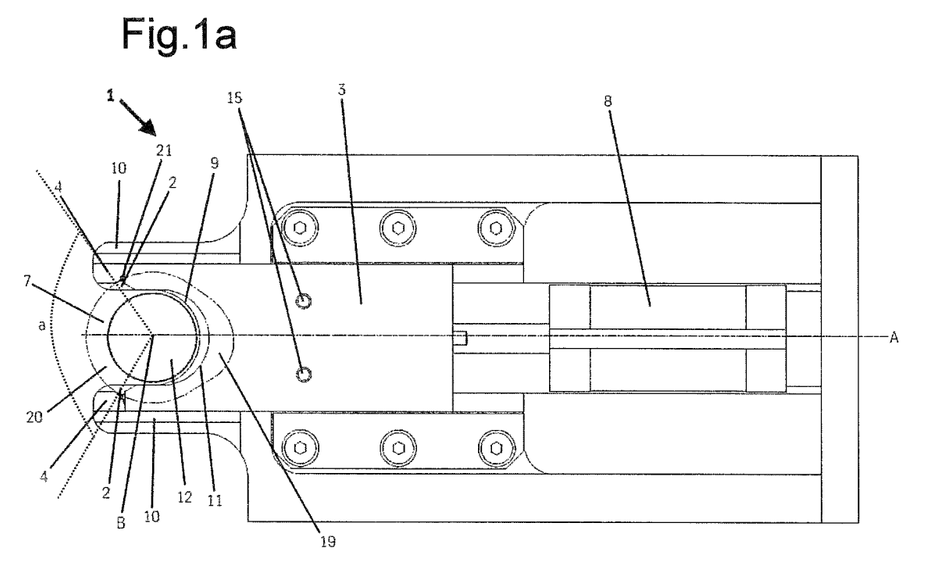
FIG. 1a is a top plan view, along an axial direction, of an embodiment of a clamping nest of the present disclosure, having a slide disposed in a bracing position.
Figure 2:
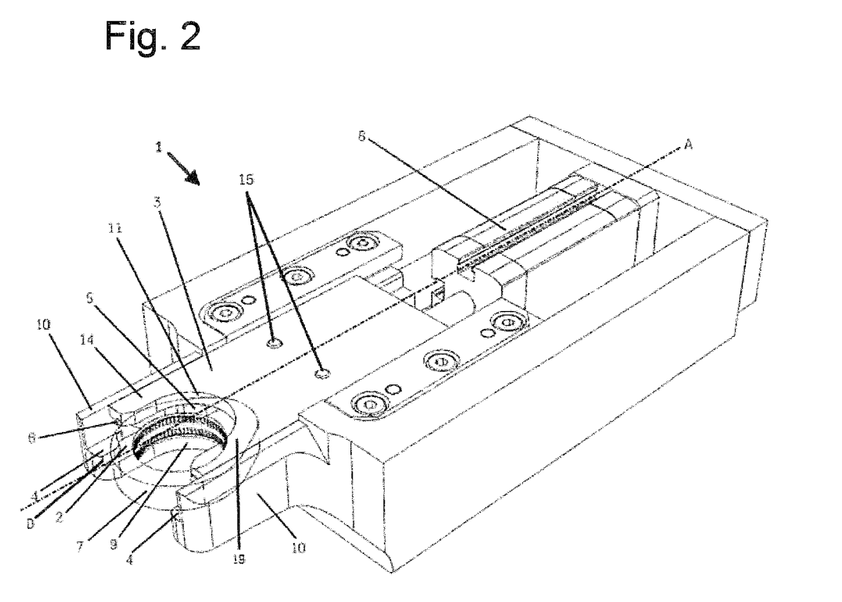
FIG. 2 is an isometric view of a clamping nest of the present disclosure, having a slide disposed in a bracing position.

FIG. 1a illustrates a plan view along an axial direction of a clamping nest 1 according to the invention. The axial direction is illustrated, for example, in FIG. 4 and is designated there by R. The clamping nest 1 comprises a bearing surface 2 and an opposite bearing surface, which is formed by the slide 3. The slide 3 has an aperture 11 and the opposite bearing surface 2 has an aperture 9, these together giving rise to a fork-shaped region 10 for accommodating the component 7. The fork axis here is designated by A. In the figures illustrated, the component 7 is represented by a cam. However, other components, e.g. sensor wheels, are also possible. The component 7 has a circular-cylindrical aperture 12 and an extension 19, which extends radially away from the shaft. The bearing surface 2 and the opposite bearing surface, which is formed by the slide 3, secure the axial positions of the component 7 in both axial directions. The slide 3 can be moved in the direction of the fork axis A, that is to say in the radial direction, between a bracing position and an accommodating position. Two first clamping elements 5 are connected to the slide 3, said clamping elements being spaced apart from the fork end of the slide 3 to the extent where, in the bracing position illustrated in FIG. 1a, they act on the extension 19 of the component 7. The particular illustration means that the clamping elements 5 in FIG. 1a are concealed by the slide 3. In the perspective illustration of FIG. 2, however, they can be seen. Two second clamping elements 4 are connected to the bearing surface 2, said clamping elements being arranged at the fork end of the bearing surface 2. The first clamping elements 5 and the second clamping elements 4 are designed, and positioned, such that, in the bracing position, they secure the angled position of the component 7 within the fork-shaped region 10.

The two second clamping elements 4 act on the central part 20 of the component 7 at the respective contact regions 21. The two contact regions 21 are spaced apart by an angular distance a, as seen in relation to the axis of rotation B of the shaft, of, in the present case, for example approximately 100°. The first clamping elements 5 and the second clamping elements 4 are arranged such that the component 7 can be accommodated in an orientation in which the extension 19 is oriented essentially along the fork axis A in the direction of the clamping nest 1. In addition, the two first clamping elements 5 are spaced apart from one another by such a distance that the extension 19 of the component 7, in the bracing position, ends up located between the two first clamping elements 5.

Figure 1B:
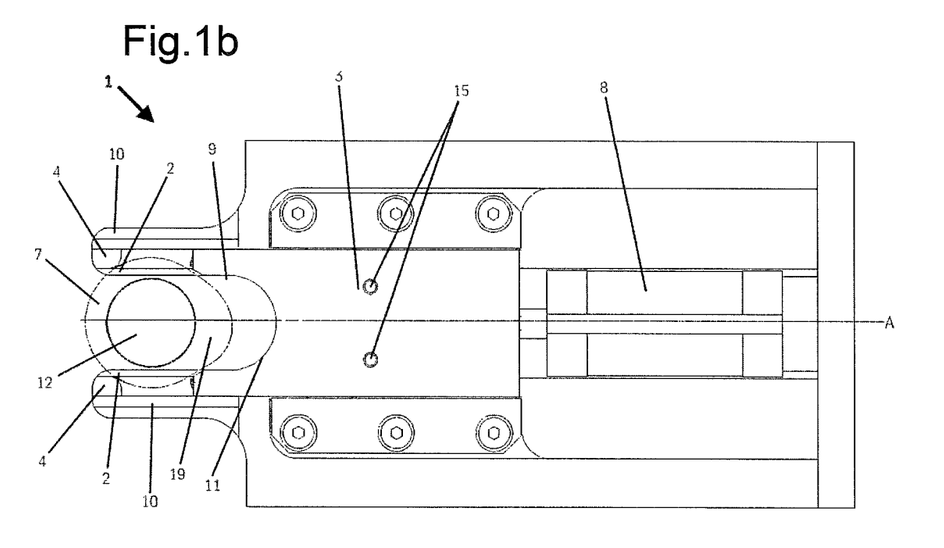
FIG. 1b is a top plan view, along an axial direction, of an embodiment of a clamping nest of the present disclosure, having a slide disposed in an accommodating position.
Figure 3:
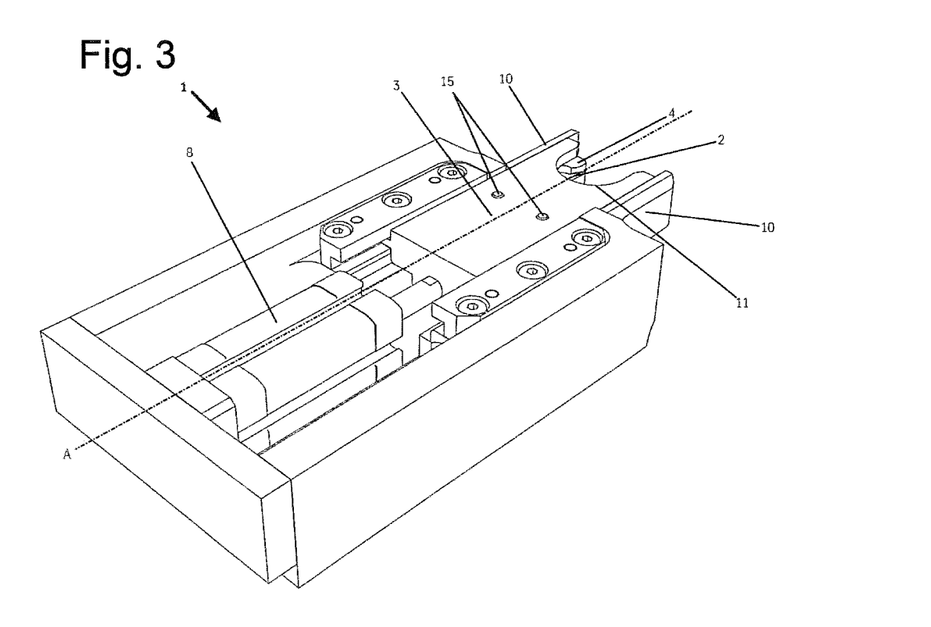
FIG. 3 is an alternate isometric view of the clamping nest of FIG. 2, having the slide disposed in the bracing position.
Figure 4:
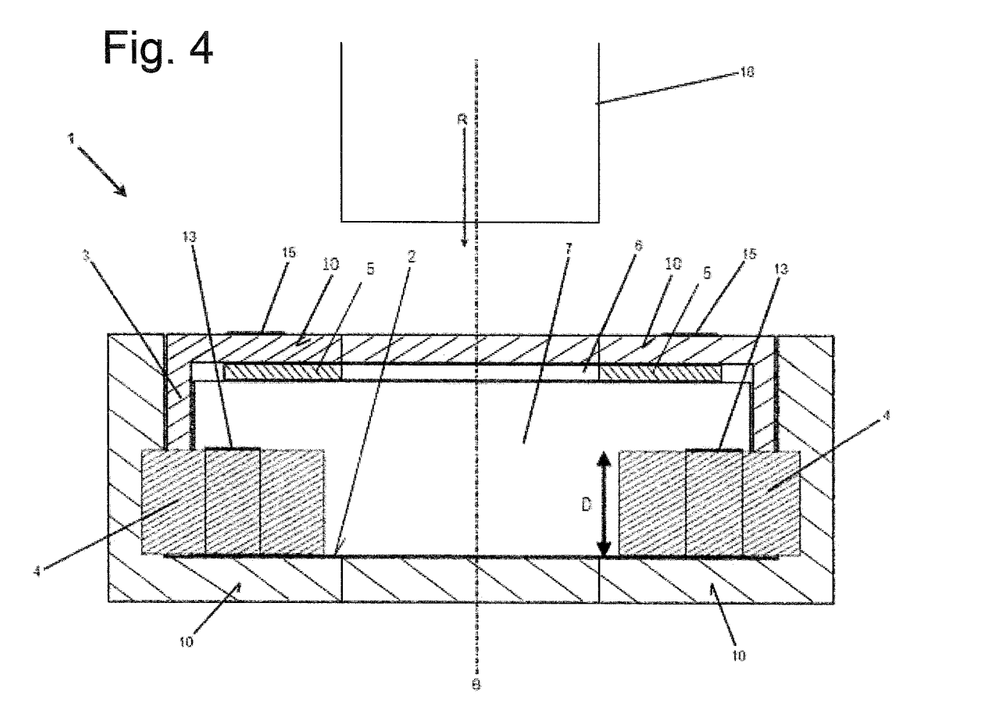
FIG. 4 is a front plan view of an embodiment of a clamping nest of the present disclosure, taken along a radial direction of the clamping nest, and having a slide in the bracing position.

FIG. 1b shows the clamping nest 1 according to the invention in the accommodating position. In this case, the slide 3, in comparison with the bracing position, is pulled back from the fork end of the clamping nest 1. For this purpose, the clamping nest 1 has an adjusting unit 8. Whereas the second clamping elements 4, in the case of the embodiment illustrated, are formed in one piece with the bearing surface 2, the first clamping elements 5 are connected to the slide 3 via fastening elements 15. As an alternative, it is also possible for the second clamping elements 4 to be configured separately and to be connected to the bearing surface 2 via fastening elements 13. This is illustrated, for example, in FIG. 4. FIG. 4 is a view of the clamping nest 1 according to the invention along a radial direction. The observer here is looking, so to speak, frontwise into the fork-shaped region 10. The second clamping elements 4 are formed here by ball bearings, which are connected to the bearing surface 2 by means of fastening elements 13. FIG. 4 also illustrates a shaft 16, which has an axis of rotation B and is introduced into the circular-cylindrical aperture 12 of the component 7 along the axial direction R. On account of the viewing direction into the fork-shaped region 10 along the fork axis A (shown in FIG. 3), FIG. 4, then, also shows the fixing element 6, which in this case is a leaf spring. The fixing element 6 belongs to the bearing surface formed by the slide 3 and serves to fix the axial position of the component between the bearing surface 2 and the slide 3 by a press fit. For this purpose, the leaf spring 6 is arranged on that side of the slide 3 which is directed toward the bearing surface 2. When the slide 3 is closed, i.e. when the slide 3 is moved from the accommodating position into the bracing position, the component 7 is supported on the second clamping elements 4. The leaf spring 6 is thus compressed and subjects the component 7 to a force in the axial direction R. This fixes the axial position of the component 7 between the bearing surface 2 and the slide 3 in the form of a press fit. At the same time, the first clamping elements 5 act on both sides of the extension 19, and the component 7 is therefore clamped in (see FIG. 2). By virtue of the slide being closed, the extension 19 of the component 7 is centered, in addition, between the two first clamping elements 5. Even if the component 7 has therefore not been introduced with the correct angled position, it is rotated into the predetermined angled position by virtue of the slide 3 being closed.

Once the component 7 has been fastened on the shaft 16, the slide 3 is moved radially away from the shaft 16, and therefore the clamping nest 1 is moved into the accommodating position again. The clamping nest 1 cannot then readily be removed in the radial direction since, on account of the extent D of the second clamping elements 4, there is a form fit present between the clamping nest 1 and the component 7. Therefore, the clamping nest 1 is moved first of all in the axial direction, until there is no longer any form fit present in the radial direction since the second clamping elements 4, in the axial direction, have an extent D which is smaller than the distance between the opposite bearing surfaces 2, 3. It is thus possible for the clamping nest 1 to be used even if the operating distances involved are small. The clamping nest 1 is then removed in the radial direction.

Figure 5:
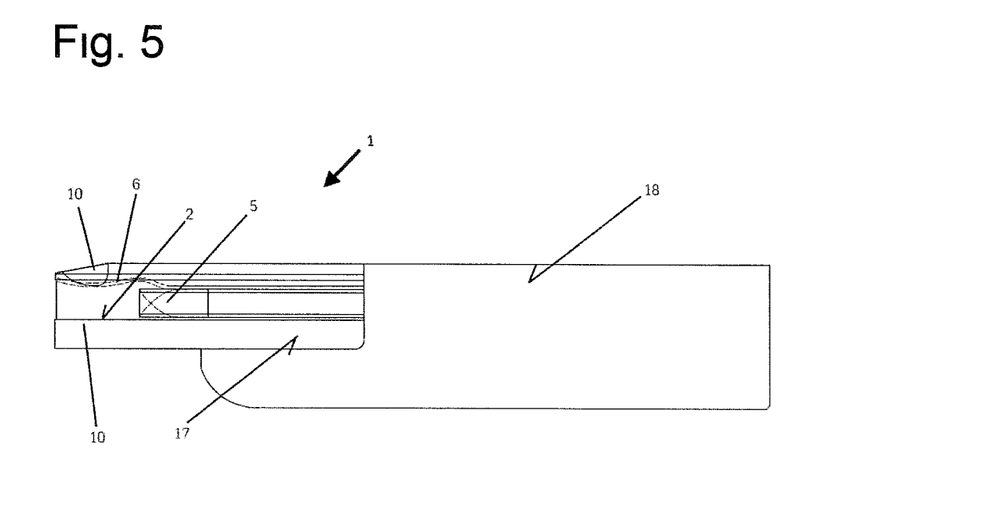
FIG. 5 is a side cross-section view of an embodiment of a clamping nest, without a slide, as disclosed herein.

FIG. 5 shows a longitudinal section through a clamping nest 1 according to the invention without a slide.

Figure 6:
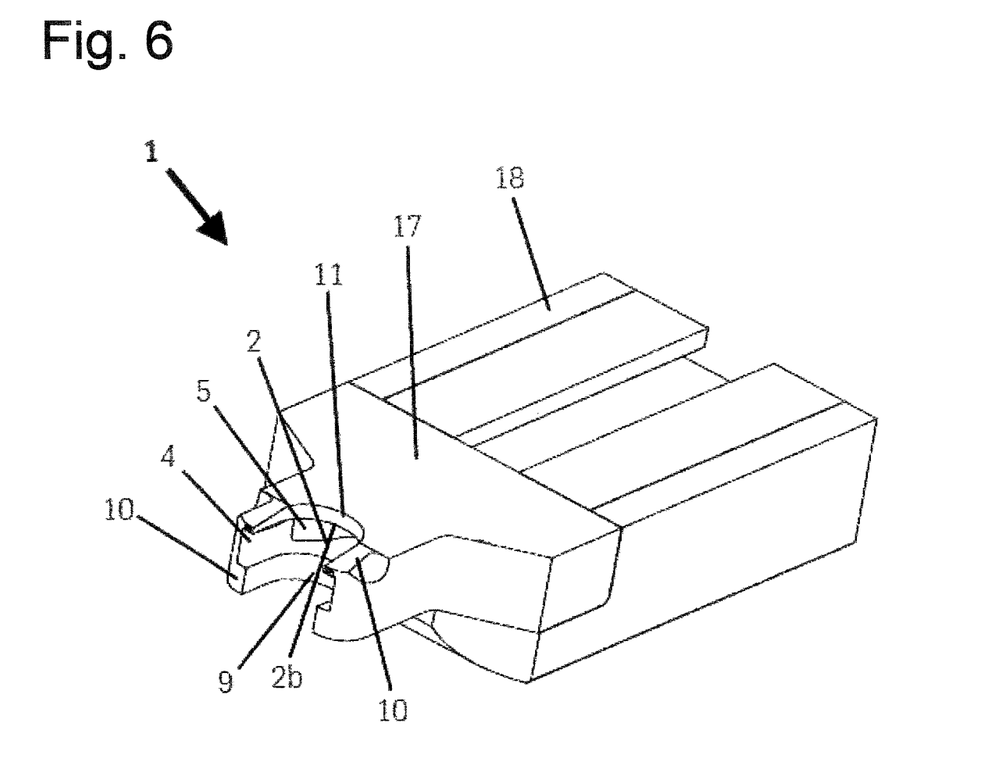
FIG. 6 is an isometric view of an embodiment of a clamping nest, without a slide, as disclosed herein.

FIG. 6 shows a corresponding three-dimensional illustration of the same clamping nest 1 without a slide. The clamping nest 1 comprises a head part 17 and a carrier element 18. The head part 17 has a fork-shaped region 10 for accommodating a component. The fork-shaped region 10 also has two opposite bearing surfaces 2 and 2b, which secure the axial position of the component in a form-fitting manner in both axial directions. The angled position of the component within the fork-shaped region 10 is secured by the plurality of clamping elements 4 and 5. The plurality of clamping elements 4, 5 here comprise two first clamping elements 5, which are spaced apart from the fork end of the clamping nest 1 to the extent where they act on the extension of the component, and two second clamping elements 4, which are arranged in such proximity to the fork end that they act on the central part of the component. The bearing surface 2b, which is illustrated at the top in FIG. 5, comprises a fixing element on the side directed towards the other bearing surface 2, in order to fix the axial position of the component between the two bearing surfaces 2, 2b by a press fit. When the component is pushed into the fork-shaped region 10, the fixing element, which in the present case is formed by a leaf spring 6, is compressed and the leaf spring 6 then fixes the component between the two bearing surfaces, in which it presses the component onto the bearing surface 2.

Figure 7A:
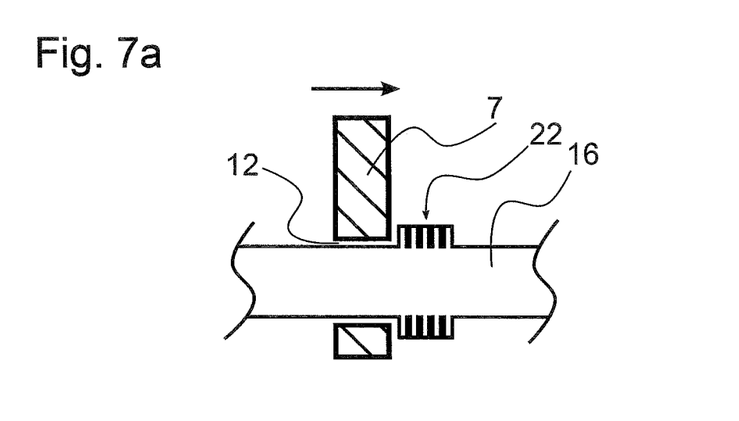
FIG. 7a is a schematic cross-section detail view showing an embodiment of the pressing of a component onto a widened portion of a shaft.
Figure 7B:
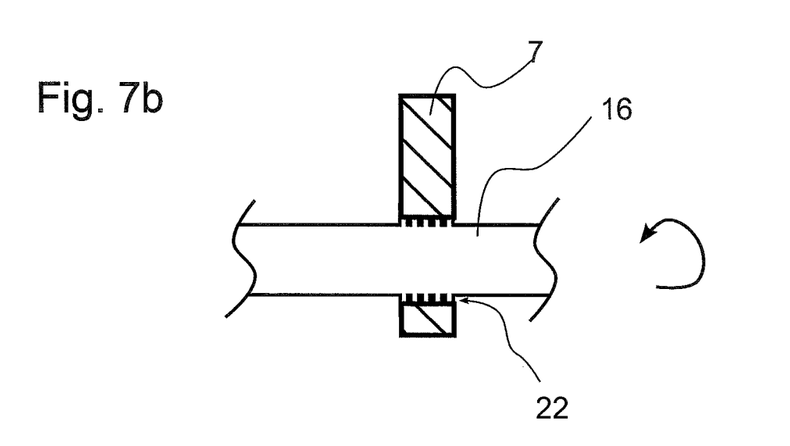
FIG. 7b is a schematic cross-section detail view showing an embodiment of the adjusting of an angle of a component pressed onto a widened portion of a shaft.
Figure 7C:
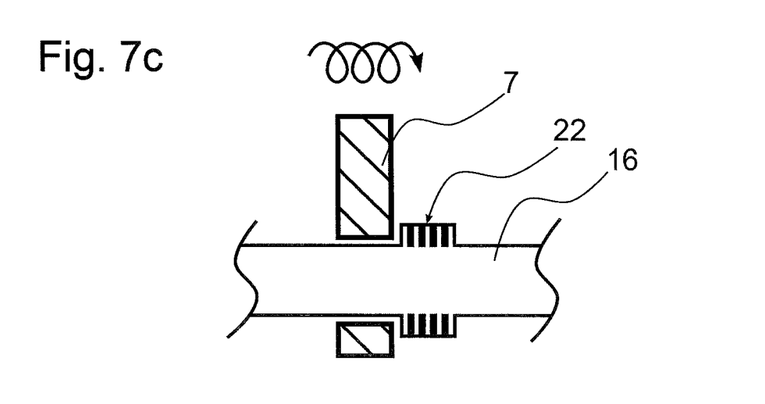
FIG. 7c is a schematic cross-section detail view showing an embodiment of the process of adjusting an angle of a component that is being pressed onto a shaft.

FIGS. 7a-7c show schematically, the different variants for fastening a component 7 on the shaft 16. The shaft 16 has a respective widened portion 22, the diameter of which is larger than the internal diameter of the circular-cylindrical aperture 12 of the component. The component is pressed onto the widened portion 22 by means of the clamping nest, which is not illustrated in FIGS. 7a-7c. The widened portion 22, in the present case, is configured in the form of a rolled formation. As is indicated in FIG. 7b by the curved arrow, it is beneficial, in some embodiments, for the component 7 to be rotated relative to the shaft 16 in the definitive axial position. This increases the strength of the fit and thus ensures that a higher amount of torque can be transmitted. This rotation of the component relative to the shaft 16 can be carried out with particularly good effect with the aid of the clamping nest according to the invention. By virtue of the component 7 being fitted within the clamping nest in a rotationally fixed manner as a result of the plurality of clamping elements, a high torque can be transmitted to the component and the component 7 can thus be rotated relative to the shaft 16. In the case of the variant indicated in FIG. 7c, the component is rotated at the same time as it is being pressed on to the widened portion 22. This is indicated by the helical arrow.

The invention claimed is:

1. A clamping nest for positioning a component on a shaft and joining it thereto, comprising: a fork-shaped clamping fixture, comprising: a fork-shaped fixed base having a first bearing surface disposed thereon; and a fork-shaped adjustable slide operably coupled to said fixed base and having a second bearing surface disposed thereon, said first bearing surface facing said second bearing surface, and an open cavity defined therebetween for accommodating the component, said first and second bearing surfaces together being configured to secure the component therebetween such that the component is fixed axially in position in said clamping fixture; and a plurality of clamping elements disposed between said fixed base and said adjustable slide and configured to move with respect to said fixed base in a radial direction between a closed position and an open position to fix a rotational position of the component.

2. The clamping nest of claim 1, wherein said first and second bearing surfaces are configured to move the component along the shaft, in opposing axial directions, by a complimentary movement of the clamping nest.

3. The clamping nest of claim 1, wherein said fork-shaped clamping fixture further includes a proximal end, a distal forked end configured to secure the component, and a fork axis extending therebetween along a length of the clamping fixture, said fork axis further being oriented perpendicular to a central axis of the component when the component is secured in the fork-shaped clamping fixture, and wherein said plurality of clamping elements are further configured such that, for a component having a cylindrical aperture and at least one extension protruding radially outward away from the aperture, the component is secured in said fork-shaped clamping fixture in an orientation in which the at least one extension is aligned with the fork axis and pointing toward said proximal end.

4. The clamping nest of claim 1, wherein said first and second bearing surfaces permit the component secured therein to be press fit onto a widened section of the shaft by movement of the fork-shaped clamping fixture.

5. The clamping nest of claim 1, wherein at least one of said first or second bearing surfaces has a fixing element coupled thereto that both protrudes toward the other of said first or second bearing surface and is configured to secure axially, by a press fit, the position of the component between the first and second bearing surfaces.

6. The clamping nest of claim 5, wherein the fixing element is a leaf spring.

7. The clamping nest of claim 1, wherein at least one of said clamping elements is a ball bearing.

8. The clamping nest of claim 3, wherein said adjustable slide is configured to be slid toward said distal forked end when said adjustable slide is moved from the open position to the closed position, and toward said proximal end and away from said distal forked end when said adjustable slide is moved from the closed position to the open position, and wherein, when said adjustable slide is disposed at said closed position, said first bearing surface on said fixed base and said second bearing surface on said adjustable slide are configured to secure the position, axially, of the component.

9. The clamping nest of claim 3, wherein at least a first clamping element from said plurality of clamping elements is disposed on said adjustable slide, and at least a second clamping element is disposed on said fixed base.

10. The clamping nest of claim 9, wherein said at least one first clamping element and said at least one second clamping element are configured to secure the rotational position of the component when said adjustable slide is positioned in the closed position.

11. The clamping nest of claim 10, wherein said at least one first clamping element is disposed proximal from said distal forked end and said at least one second clamping element is disposed at said distal forked end and distal to said first clamping element, said at least one first and second clamping elements being configured such that, when the clamping nest secures therein a component having said at least one extension protruding radially outward away from the component aperture and said adjustable slide is disposed in the closed position, said at least one first clamping element bears on the extension protruding from the component and said at least one second clamping element bears on a central part of the component.

12. The clamping nest of claim 11, wherein said at least one first clamping element comprises a pair of first clamping elements that are spaced apart such that both of said first clamping elements bear on the extension protruding from the component on opposing sides of the extension.

13. The clamping nest of claim 11, wherein said at least one second clamping element comprises two second clamping elements disposed on said first bearing surface, both of which bear on the central part of the component, and wherein said two second clamping elements are spaced apart such that a rotational angle between the two of them with respect to the central axis of the aperture of the component is between 50° and 130°.

14. The clamping nest of claim 11, wherein said at least one first clamping element and said at least one second clamping element are configured to cooperatively rotate the component to a predetermined angled position between said first and second bearing surfaces, by a movement of said slide from the open accommodating position to the closed bracing position.

15. The clamping nest of claim 11, wherein said at least one second clamping element protrudes from said base towards said slide and has a height that is smaller than a distance between said first and second bearing surfaces.

16. A clamping nest for positioning a component on a shaft and joining it thereto, comprising:

a fork-shaped clamping fixture having a first bearing surface and an opposing second bearing surface facing said first bearing surface, and an open cavity defined therebetween for accommodating the component, said first and second bearing surfaces together being configured to secure the component therebetween such that the component is fixed axially in position in said clamping fixture; and a plurality of clamping elements disposed on at least one of said first or second bearing surfaces that are configured to fix a rotational position of the component within said fork-shaped clamping fixture;

wherein at least one of said first or second bearing surfaces has a fixing element coupled thereto that both protrudes toward the other of said first or second bearing surface and is configured to secure axially, by a press fit, the position of the component between the first and second bearing surfaces; and wherein the fixing element is a leaf spring.

* * * * *